No. 879,927. PATENTED FEB. 25, 1908.
R. B. TREAT.
POLE SHOE FOR DYNAMO ELECTRIC MACHINES.
APPLICATION FILED APR. 9, 1906.

Witnesses
Samuel W. Balch

Inventor,
Robert B. Treat,
by Thomas Ewing Jr.
Attorney.

UNITED STATES PATENT OFFICE.

ROBERT BELDEN TREAT, OF NEWARK, NEW JERSEY, ASSIGNOR TO CROCKER-WHEELER COMPANY, OF AMPERE, NEW JERSEY, A CORPORATION OF NEW JERSEY.

POLE-SHOE FOR DYNAMO-ELECTRIC MACHINES.

No. 879,927.   Specification of Letters Patent.   Patented Feb. 25, 1908.

Application filed April 9, 1906. Serial No. 310,588.

*To all whom it may concern:*

Be it known that I, ROBERT BELDEN TREAT, a citizen of the United States of America, and a resident of Newark, county of Essex, and State of New Jersey, have invented certain new and useful Improvements in Pole-Shoes for Dynamo-Electric Machines, of which the following is a specification.

My invention relates to the construction of pole shoes for the field magnets of dynamo electric machines, and the novel features reside especially in the construction of the tips of the pole shoes which overhang the cores to which the shoes are attached.

The object of the invention is to provide a construction for the tips of pole shoes whereby a crowding of the lines of magnetic force therein and distortion of the magnetic field through armature reactions is prevented, and to attain this in a construction with an unbroken polar surface and a rigid construction of the tips.

A further object of the invention is to provide a construction whereby the magnetic flux is progressively diminished toward the point of the tip so that the magnetic attraction between each armature tooth and the pole shoe is progressively reduced as the tooth approaches the extreme tip of the pole and less jar and vibration is occasioned by the breaking away of the armature teeth from their magnetic attraction to the pole shoe.

Figure 1:
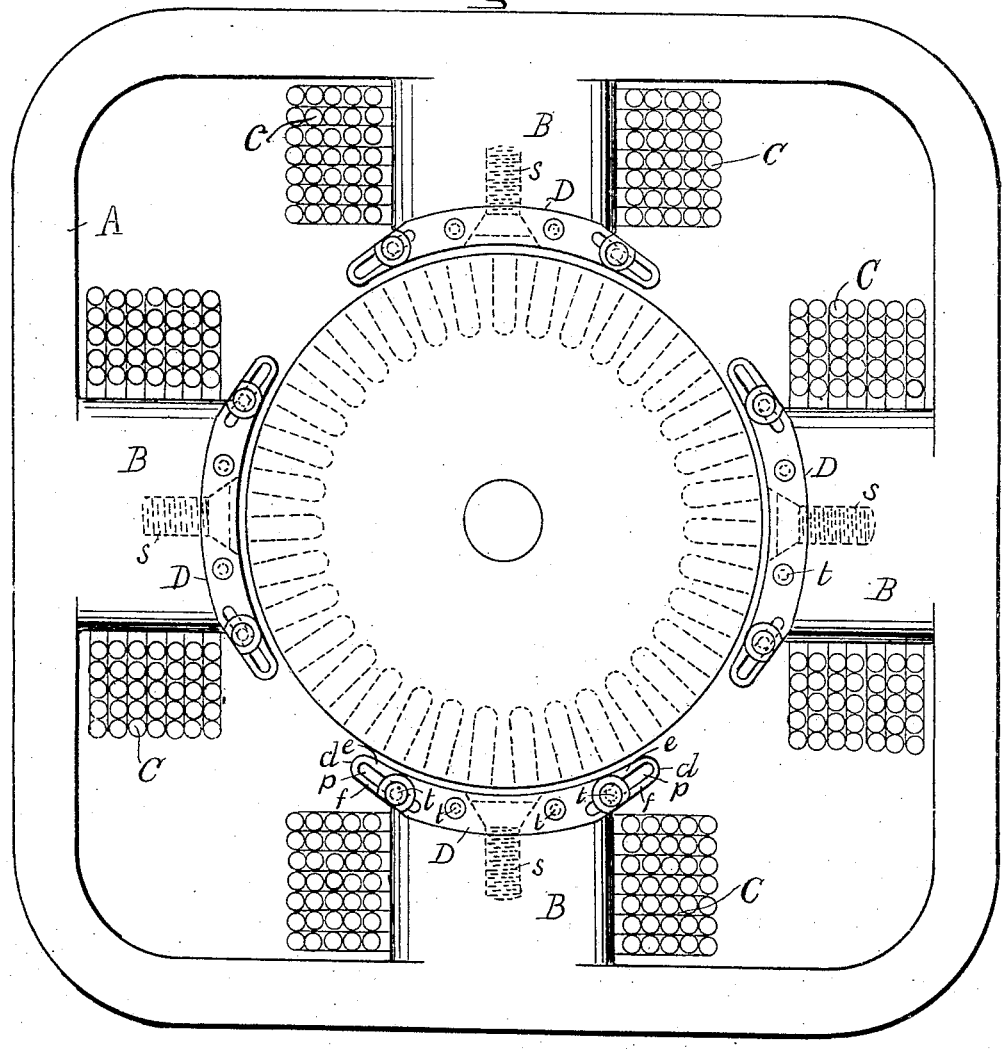
Figure 2:
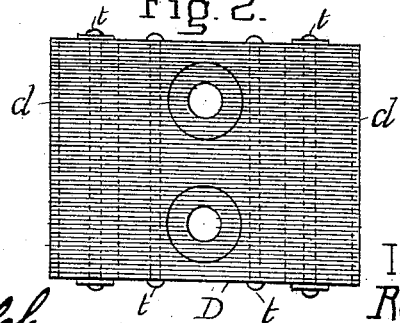

In the accompanying sheet of drawings which forms a part of this application, Figure 1 is an elevation of the frame of a dynamo electric machine with field coils in section and provided with pole shoes embodying my invention, the armature being contained within the frame and the supports for the armature shaft being omitted. Fig. 2 is a face view of one of the pole-shoes.

The invention is illustrated in connection with a four-pole dynamo electric machine in which a frame A supports four inwardly projecting poles or cores B B which carry magnet windings C C for the excitation of magnetism in the cores. Pole shoes D D, formed of sheet iron, held together by rivets $t\ t$, are fastened to the ends of the cores by screws $s\ s$. The faces of the pole shoes are larger than the faces of the cores and are separable from the cores to permit of laminated construction and also so that formed field coils may be slipped onto the cores when the pole shoes are removed. The portions of the pole shoes which overhang the cores are the pole tips $d\ d$. The end portions of each of the laminations of the pole shoes, which together form these pole tips, are perforated at $p\ p$, and in the assembled laminations these perforations form tunnels parallel to the axis of the machine and through the pole tips wholly below the polar surface of the pole shoe and serve to cut down the area of metal which connects the tips with the bodies of the pole shoe, whereby the magnetization through this connecting metal is at all times practically saturated and therefore cannot be further increased by cross-magnetization from armature reactions and the magnetic field distorted.

The perforations in the laminæ of each of the pole shoes are preferably elongated in the direction of the tips, the axis of the elongation being inclined to the face of the pole shoe at the tip, so that the extreme end of the tip is supported from the body of the pole shoe by two branches of metal with the branch $e$ which lies on the face side of triangular form, the base of the triangle being toward the body of the pole shoe. This branch is chiefly instrumental in conducting the magnetization into the tip from the body of the shoe, and by reason of its progressively diminishing cross section toward the point of the tip a similar graduation in the magnetic flux is insured. The other branch $f$ lies on the rear side and serves as a brace to the tip.

What I claim as new and desire to secure by Letters Patent of the United States is:

A pole shoe for a dynamo electric machine provided with pole tips, each having an elongated perforation inclined to the face of the pole shoe at the tip, substantially as described.

Signed by me at Ampere, N. J., this 3d day of April, 1906.

ROBERT BELDEN TREAT.

Witnesses:
 FREDERICK E. WARD,
 EDWIN R. DOUGLAS.